US008249893B1

(12) United States Patent
Allen

(10) Patent No.: US 8,249,893 B1
(45) Date of Patent: Aug. 21, 2012

(54) AUTOMATED SERVICE PROVIDER PAYMENT METHOD

(75) Inventor: Robert M. Allen, Richardson, TX (US)

(73) Assignee: StoneEagle Services, Inc., Richardson, TX (US)

( * ) Notice: Subject to any disclaimer, the term of this patent is extended or adjusted under 35 U.S.C. 154(b) by 0 days.

(21) Appl. No.: 13/440,265

(22) Filed: Apr. 5, 2012

(51) Int. Cl.
*G06Q 50/00* (2012.01)
*G06Q 40/00* (2012.01)

(52) U.S. Cl. .............................................. 705/2; 705/4
(58) Field of Classification Search .................... 705/2–4
See application file for complete search history.

(56) References Cited

U.S. PATENT DOCUMENTS

| 6,188,766 B1 | 2/2001 | Kocher |
| 6,343,310 B1 | 1/2002 | DiRienzo |
| 6,901,387 B2 * | 5/2005 | Wells et al. ...................... 705/64 |
| 7,072,842 B2 | 7/2006 | Provost et al. |
| 7,229,011 B2 | 6/2007 | Hansen et al. |
| 7,246,068 B2 | 7/2007 | Thomas, Jr. |
| 7,434,729 B2 | 10/2008 | Cracchiolo et al. |
| 7,590,557 B2 | 9/2009 | Harrison et al. |
| 7,792,686 B2 * | 9/2010 | Allen .............................. 705/2 |
| 7,895,119 B2 | 2/2011 | Praisner |
| 7,922,083 B2 * | 4/2011 | Harrison et al. ............. 235/381 |
| 7,925,518 B2 * | 4/2011 | Lee et al. ......................... 705/2 |
| 7,958,049 B2 | 6/2011 | Jamison et al. |
| 2002/0072942 A1 | 6/2002 | Kuykendall et al. |
| 2003/0200118 A1 * | 10/2003 | Lee et al. ......................... 705/2 |
| 2004/0172312 A1 | 9/2004 | Selwanes et al. |
| 2005/0086075 A1 | 4/2005 | Kaehler et al. |
| 2005/0108153 A1 | 5/2005 | Thomas et al. |
| 2005/0122953 A1 | 6/2005 | Ilic |
| 2005/0209964 A1 * | 9/2005 | Allen et al. ...................... 705/40 |
| 2007/0005402 A1 | 1/2007 | Kennedy et al. |
| 2007/0168283 A1 | 7/2007 | Alvarez et al. |
| 2008/0010096 A1 | 1/2008 | Patterson et al. |
| 2008/0133266 A1 * | 6/2008 | Allen .............................. 705/2 |
| 2008/0140447 A1 | 6/2008 | Pourfallah et al. |
| 2008/0281641 A1 | 11/2008 | Pilzer et al. |
| 2009/0037333 A1 | 2/2009 | Flitcroft et al. |
| 2010/0017235 A1 * | 1/2010 | Clubb et al. ..................... 705/4 |
| 2010/0030580 A1 | 2/2010 | Salwan |
| 2010/0030688 A1 * | 2/2010 | Patterson ....................... 705/44 |
| 2010/0138324 A1 * | 6/2010 | Allen ............................. 705/30 |
| 2010/0161457 A1 * | 6/2010 | Katz et al. ...................... 705/30 |

(Continued)

OTHER PUBLICATIONS

Shingles, et al., "Next Phase of Medical Management Systems: Automating Administrative Transactions to Integrate Payors and Providers", JHIM: Journal of Healthcare Information Management.

(Continued)

*Primary Examiner* — Robert Morgan
*Assistant Examiner* — Robert Sorey
(74) *Attorney, Agent, or Firm* — Anton J. Hopen; Smith & Hopen, P.A.

(57) ABSTRACT

A method of facilitating payments to service providers such as medical practitioners wherein a virtual payment card issued by a card processor is processed by the service provider responsive to a first payment. The merchant identification number of the service provider and its associated acquirer are captured by the card processor. Subsequent payments to the service provider are made directly from the card processor to the acquirer and an authorization confirmation of the direct payment and an explanation of benefits are sent to the service provider which no longer needs to run virtual payment cards through its card processing system.

20 Claims, 4 Drawing Sheets

U.S. PATENT DOCUMENTS

| | | | |
|---|---|---|---|
| 2010/0174556 A1* | 7/2010 | Wilkins et al. | 705/3 |
| 2010/0185466 A1 | 7/2010 | Paradis et al. | |
| 2010/0205078 A1 | 8/2010 | Lawrence et al. | |
| 2010/0288834 A1* | 11/2010 | Tichelaer et al. | 235/380 |
| 2011/0087598 A1 | 4/2011 | Bozeman | |
| 2011/0125638 A1* | 5/2011 | Davis et al. | 705/41 |
| 2011/0166872 A1* | 7/2011 | Cervenka et al. | 705/2 |
| 2011/0178816 A1 | 7/2011 | Lee et al. | |
| 2011/0184857 A1 | 7/2011 | Shakkarwar | |
| 2012/0095787 A1* | 4/2012 | Davis et al. | 705/4 |

OTHER PUBLICATIONS

Brousseau, "IBML and the Move Toward Healthcare Electronification", Today, TAWPI, Mar./Apr. 2009, pp. 8-10.

Baker, "Persistence Pays When Posting Payments", Lockbox Payments, Today, TAWPI, Nov./Dec. 2009, pp. 22-23.

Credit Cards, Rising Interchange Fees Have Increased Costs for Merchants, but Options for Reducing Fees Pose Challenges, Highlights of GAO-10-45, Nov. 2009.

Visa's Global Registry of Service Providers-Independent Sales Organizations and Encryption Support Organizations as of Mar. 1, 2012, Visa Inc. 2010, pp. 1-53.

MasterCard Worldwide U.S. and Interregional Interchange Rates, Rates and Criteria Effective as of Oct. 2011, MasterCard 2011, pp. 1-170.

The Payment Card Economics Review, The Industry and Its Legal Challenges, An occasional publication of payingwithplastic.org., vol. 2, pp. 1-224.

Levitin, Priceless? The Social Costs of Credit Card Merchant Restraints, Harvard Journal on Legislation, 2008, vol. 45, pp. 1-58.

The Anatomy of a Transaction, MasterCard Worldwide, AOTE-0707, MasterCard, 2007, pp. 1.

\* cited by examiner

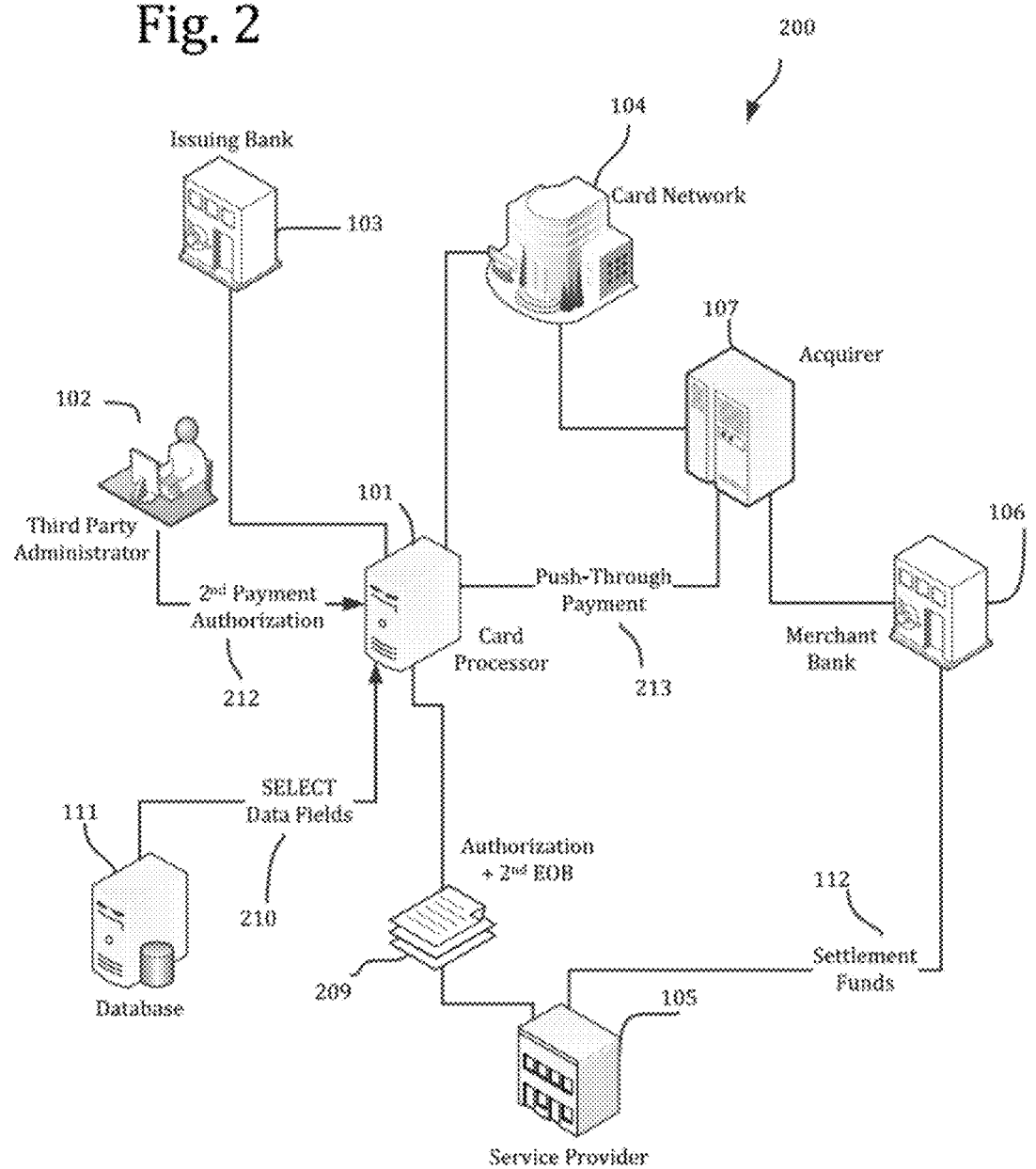

Fig. 3

VPay® Virtual Payment
111 W. Spring Valley Rd.
Richardson, Texas 75081

PAYMENT ID: 000040710008

Medi Clinic
PO Box 9999
Dallas, TX 75353

EXPLANATION OF BENEFITS

Questions? Contact Customer Service at (800) 252-9653

| | |
|---|---|
| Claim No.: | 000000000000000-MM |
| Group Name: | The Clinical Group, Inc. |
| Group #: | 001 |
| Employee: | John Doe |
| Patient: | James Smith |
| Pat Acct: | A101010-555555 |
| Provider: | Medi Clinic |
| Prepared On: | 11/28/2011 |

Patient Responsibility

| | |
|---|---|
| Amount Not Covered: | .00 |
| Co-Pay Amount: | 20.00 |
| Deductible: | .00 |
| Co-Insurance: | .00 |
| Total Patient Responsibility: | 20.00 |
| Other Insurance Payment: | |

| Treatment Date | Service Code | Procedure | Charge Amt. | Not Covered | Reason Code | PPO Discount | Covered Amt. | Deduct. Amt. | Co-Pay Amt. | Paid Amt. | Pmt. Amt. |
|---|---|---|---|---|---|---|---|---|---|---|---|
| 9/3/2011 | 528 | 99203 | 163.00 | .00 | N371 | 18.39 | 124.61 | .00 | 20.00 | 100% | 124.61 |
| Totals | | | 163.00 | .00 | | 18.39 | 124.61 | .00 | 20.00 | | 124.61 |

Other insurance credits or adjustments: .00
Total payment amount: 124.61

Service Code
538   URGENT CARE VISIT

Messages:
*APPEAL: You may file an appeal of the claim decision by sending a written request within 180 days from the date of this Notice to VPay® Virtual Payment, 111 W. Spring Valley Rd. Richardson, Texas....*

If you have any questions regarding your Virtual Card, please call
1-866-534-9732

Medi Clinic
PO Box 9999
Dallas, TX 75353

| Payment To: | Check No. | Amount |
|---|---|---|
| CareNow | 5074 | $124.61 |

Reason Code
N3   Processed/Contractual Agreement
T1   Co-Pay

Fig. 4

VPay® Virtual Payment
111 W. Spring Valley Rd.
Richardson, Texas 75081

*You've been VPaid™*

PAYMENT ID: 0304071008

Medi Clinic
PO Box 9999
Dallas, TX 75353

EXPLANATION OF BENEFITS

Questions? Contact Customer Service
at (800) 252-9653

| Claim No.: | 0000000000000000-MM |
|---|---|
| Group Name: | The Clinical Group, Inc. |
| Group #: | 001 |
| Employee: | John Doe |
| Patient: | James Smith |
| Pat Acct: | A101010-555555 |
| Provider: | Medi Clinic |
| Prepared On: | 11/28/2011 |

Patient Responsibility

| Amount Not Covered: | .00 |
|---|---|
| Co-Pay Amount: | 20.00 |
| Deductible: | .00 |
| Co-Insurance: | .00 |
| Total Patient Responsibility: | 20.00 |
| Other Insurance Payment: | |

| Treatment Date | Service Code | Procedure | Charge Amt. | Not Covered | Reason Code | PPO Discount | Covered Amt. | Deduct. Amt. | Co-Pay Amt. | Paid Amt. | Pmt. Amt. |
|---|---|---|---|---|---|---|---|---|---|---|---|
| 9/3/2011 | 538 | 99203 | 163.00 | .00 | N3T1 | 18.39 | 124.61 | .00 | 20.00 | 100% | 124.61 |
| | | Totals | 163.00 | .00 | | 18.39 | 124.61 | .00 | 20.00 | | 124.61 |

Other insurance credits or adjustments: .00
Total payment amount: 124.61

Service Code
538   URGENT CARE VISIT

Messages:
*APPEAL: You may file an appeal of the claim decision by sending a written request within 180 days from the date of this Notice to VPay® Virtual Payment, 111 W. Spring Valley Rd. Richardson, Texas....*

If you have any questions regarding your Virtual Card, please call
1-866-534-9732

Medi Clinic
PO Box 9999
Dallas, TX 75353

| Payment To: | Check No. | Amount |
|---|---|---|
| CareNow | 5074 | $124.61 |

Reason Code
N3   Processed/Contractual Agreement
T1   Co-Pay

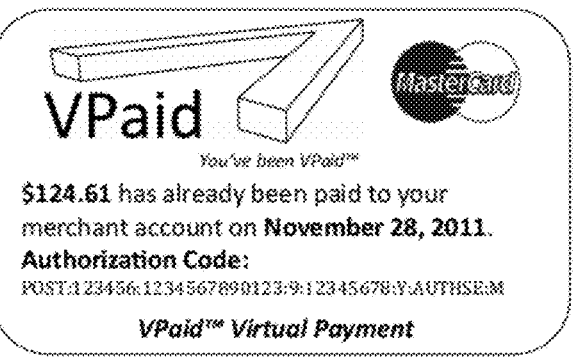

$124.61 has already been paid to your merchant account on November 28, 2011.
Authorization Code:
POST:123456;1234567890123;9;12345678;Y;AUTHSE;M

*VPaid™ Virtual Payment*

AUTOMATED SERVICE PROVIDER PAYMENT METHOD

BACKGROUND OF THE INVENTION

1. Field of the Invention

This invention relates to facilitating payments by a third party. More specifically, it relates to capturing and utilizing initial transactional data to streamline subsequent payments made using a payment card.

2. Brief Description of the Related Art

Third party administrators, insurance companies, and large self-funded corporations (herein "Payers") adjudicate claims, compare them to a benefit plan and make the decision to write checks in payment for the claims. Currently, Payers are required to print checks and explanation of benefit (EOB) forms for delivery to the health care providers. The EOB lists the amount the health care provider billed the Payer's company and the amount the Payer's company paid on the claim. It may also list the contractual discount amount and the patient responsibility. If the claim is denied, the EOB will explain the reason for denial.

In an effort to streamline this process, Applicant developed a process described in U.S. Pat. No. 7,792,686, the specification of which is incorporated herein by reference. The '686 patent discloses a method to deploy a single-use stored value card to pay medical service claims. Since there is a one-to-one relationship between the stored value card and the specific claim, reconciling the payment is made substantially more efficient. However, the method still requires the medical service provider (typically the bookkeeper) to receive the stored value card information including the expiration date, account number, payment amount, verification codes and the like and repeatedly input the information as a card-not-present transaction through the credit card terminal. The transaction must then be authorized, cleared and settled before the service provider receives its funds.

The present invention streamlines this process going forward by capturing certain data values in the initial process and then utilizes them to implement a direct push-through payment to the service provider's merchant account. The service provider does not need to perform the administrative tasks of running a card payment transmitted by the payer. Rather, the service provider is simply "paid" receiving an authorization confirmation of the completed financial transaction and an explanation of benefits detailing how the funds were applied.

An advantage to the present invention is that less card payment information is transmitted between payer and service provider thereby lowering security risk and potential fraud.

Another advantage of the present invention is that direct payment reduces the administrative burden put on the service provider to process payments.

Yet another advantage of the present invention is that the service provider is paid faster.

Yet another advantage of the present invention is a potentially lower interchange rate because the eliminated risk of processing a "card-not-present" in subsequent transactions.

Yet another advantage of the present invention is that no sign-up or enrollment is required by the service provider. The necessary data is automatically captured and utilized for subsequent direct payments.

However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need for more efficient payment of service provider claims is now met by a new, useful, and nonobvious invention.

The novel method includes the steps of transmitting a first payment to a service provider. The service provider is not necessarily limited to a medical professional. For example, a vehicle repair operation may also have warranty claims which are processed by a third party administrator to determine what payments (if any) are covered and which fall outside of the warranty agreement. The first payment includes a first explanation of benefits, a payment card account number, a payment card verification code, an expiration date and a first payment amount. The bundle of information transmitted in the first payment is used by the service provider to run a card payment through their merchant account. This is typically done by keying in the data on a point of sale card terminal or web interface.

The information is passed to an acquirer which transmits the information to the card network. The card network then sends the information to the card processor for the cardholder's bank for approval. In the approval process, the card processor receives an array of data fields from a card network authorizing the first payment. The array of data fields includes a merchant identification number associated with the service provider and an acquirer identification associated with the acquirer that processes card transactions on behalf of the service provider. The card processor stores the merchant and acquirer identification fields in a digital storage medium. The digital storage medium is typically a database such as those sold under the brands MICROSOFT SQL SERVER, ORACLE or DB2.

At the time a second payment to the service provider is needed, the card processor retrieves the stored merchant and acquirer identification fields from the digital storage medium and transmits the second payment directly to the acquirer, the second payment transmission including the merchant identification number and a second payment amount. The card processor receives an authorization response from the acquirer indicating the transaction has been approved and the acquirer will deposit funds associated with the second payment amount on behalf of the service provider. The card processor transmits a payment receipt to the service provider, the receipt including the amount paid directly to the acquirer and a second explanation of benefits.

In an embodiment of the invention one or more classifications codes are established for the service provider. For example, a dermatology medical practice would have a different classification code than a restaurant. As an added layer of security and authentication, this classification code for the service provider receiving a virtual card payment from the card processor is verified prior to authorizing the completion of the transaction. The virtual card payment may be a temporary, single-use stored value card account. The card processor simply generates an unused account number and then recycles that account number after the transaction is cleared. The stored value card may be preloaded with an amount equal to the payment amount authorized by the third party administrator. This provides both a security safeguard to overcharging and also permits more accurate and efficient reconciling of accounts.

The service provider would eventually discover they had been paid for services authorized by the third party administrator and paid directly to their acquirer. However, an embodiment of the invention merges a payment receipt and an explanation of benefits into a document that is transmitted to the service provider giving them notice that they have already been paid. The payment receipt may additionally include the amount paid, date of payment, and authorization code. The document may be transmitted electronically via fax, email, messaging, web interface or file transfer means.

One advantage of the invention includes the reduction of financial fraud liability. Transmitting payment information through any medium invokes some security concern which requires compliance with the payment card industry data security standard. By making subsequent payments directly from the card processor to the acquirer for the service provider's merchant account, there is no need to fax, email or otherwise transmit payment card information from the card processor to the service provider. A direct payment from a card processor to an acquirer (a push-through transaction) does not invoke the liability of a "card-not-present" transaction which generally results in a higher interchange rate charged by the card network or card association to cover a greater risk of fraud. An embodiment of the invention takes the difference between the higher interchange rate incurred in processing the virtual payment card with the lower interchange rate incurred in processing the direct payment to acquirer and credits the card processor with the savings difference.

BRIEF DESCRIPTION OF THE DRAWINGS

For a fuller understanding of the invention, reference should be made to the following detailed description, taken in connection with the accompanying drawings, in which:

FIG. 2 is a diagrammatic view of an embodiment of the invention showing a direct payment to the acquirer of the service provider.

FIG. 3 is an image of a merged explanation of benefits and stored-value card account payment according to an embodiment of the invention.

FIG. 4 is an image of a direct payment from card processor to acquirer merged with an explanation of benefits according to an embodiment of the invention.

DETAILED DESCRIPTION OF THE PREFERRED EMBODIMENT

Figure 1:
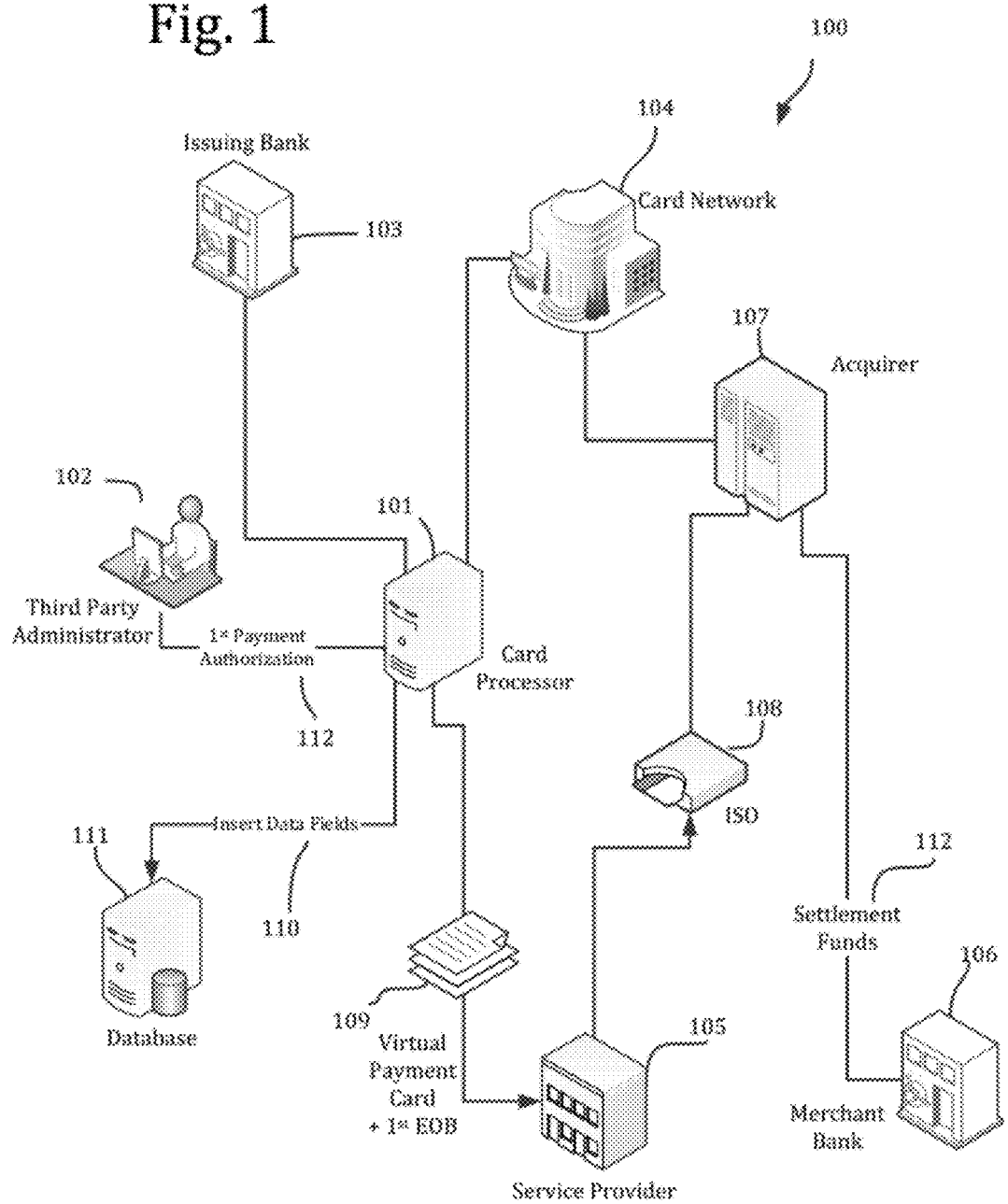
FIG. 1 is a diagrammatic view of an embodiment of the invention showing a first payment to a service provider and capture of data fields.

FIG. 1 is a diagrammatic view of an embodiment of the invention illustrating a first payment to a service provider and capture of data fields. The general process of making a first payment and capturing the necessary data fields to make a subsequent direct payment is denoted as reference 10. Card processor 101 facilitates interactions between a number of parties in the transaction processing including a third party administrator 102, an issuing bank for the card payment 103, a card network 104, a service provider 105, a merchant bank 106, and acquirer 107 and an independent sales organization (ISO) 108.

Card processor 101 in this method is unique in that the typical issuing bank 103 provides debit, credit and stored value cards directly to consumers. Issuing bank 103 extends a line of credit to a cardholder provided that the cardholder pays off the monthly balance or makes minimum payments. However, in the present invention, card processor 101 issues a virtual payment card 109 to service provider 105 to pay a first warranty or insurance claim authorized 112 by third party administrator 102. Virtual payment card 109 may be a unique, single-use stored value card loaded with an amount equal to the benefit payment authorized by third party administrator 102. Virtual payment card 109 may be transmitted to service provider 105 by a suitable transmission medium including, but not limited to, fax, SMTP, SMS, MMS, HTTP, HTTPS, and FTP.

When virtual payment card 109 is received by service provider 105 it is processed either directly through a card terminal to acquirer 107 or through ISO 108 which, in turn, feeds the processing up to acquirer 107. Acquirer 107 passes the transaction information to card network 104. Card network 104 passes the transaction details to card processor 101 including data fields 110 that include the identity of acquirer 107 and service provider 105. Card processor 101 saves data fields 110 to a digital storage medium 111 such as a relational database. Card processor 101 initially issued virtual payment card 109 so it now knows the merchant identification and acquirer identification for service provider 105. Card processor 101 authorizes payment of virtual payment card 109 which is transmitted back up through card network 104 and then to acquirer which deposits funds into merchant bank 106 to send settlement funds 112 to service provider 105.

In FIG. 2, third party administrator 102 issues second payment authorization 212 to card processor 101 for service provider 105. Card processor 101 queries database 111 for previous claims paid to service provider 105 and retrieves data fields 210 that were captured responsive to first payment authorization 112. Instead of issuing a virtual payment card 109 and transmitting to service provider 105, card processor 101 sends push-through payment 213 directly to acquirer 107 for the amount in second payment authorization 121. Push-through payment 213 includes the amount and the merchant identification associated with service provider 105 previously captured during the processing of first payment authorization 112. Push-through payment 213 is accepted by acquirer 104 which is then processed by card network 104 and back to card processor 101. An authorization code is generated indicating the transaction was approved. The authorization code and a second explanation of benefits (generated by third party administrator 102 when adjudicating the claim leading to second payment authorization 212) is transmitted 209 to service provider 105 indicating they have already been paid and how the payment was adjudicated. This saves time and administrative effort on behalf of service provider 105 which does not have to run virtual payment card 109 through its card terminal. An additional benefit is that the payment card data necessarily transmitted for the first payment authorization 112 does not need to be sent again. This reduces the security risk of fraud as no card payment account numbers need to be transmitted to service provider 105. Still another benefit of the present invention is that push-through payment 213 is inherently more secure between card processor 101 and acquirer 107. Accordingly, acquirer 107 assumes less security liability and potentially enjoys a lower interchange rate versus a "card-not-present" transaction as enumerated in FIG. 1.

FIG. 3 illustrates an exemplary embodiment of a merged explanation of benefits and stored-value card account payment. Service provider 105 need only run this transaction through its point of sale (POS) terminal a single time as card processor 101 captures the information necessary to pay a direct payment 213 to acquirer 107 in subsequent payments. When direct payment 213 is made, service provider 105 may receive a notice as illustrated in FIG. 4 which confirms payment has been made along with an associated explanation of benefits.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

GLOSSARY OF TERMS

Acquirer: a bank or financial organization that processes credit and/or debit card payments for products or services for a merchant.

Authorization: is a process by which a transaction is approved by the issuer of by the card network on behalf of the issuer. Permission is given or denied via the acquirer to accept a specific transaction from the cardholder account. The authorization indicates the card is valid and that sufficient funds are available for payment of the requested amount.

Authorization Approval Code: is a numerical code assigned to a sales transaction indicating that the sale is authorized.

Card Association: a collective network of both the card network and the banks that issue cards operable on the network's infrastructure.

Card Network: financial networks that administer the credit and debit card processing. These networks include those known by the brands VISA, MASTERCARD, AMERICAN EXPRESS, DISCOVER, DINER'S CLUB, and JCB.

Card verification code: is numeric security code that provides extra security against unauthorized use during non-face to face transactions.

Charge back: a reversal of funds or refund of a card transaction due to a dispute between the merchant and the card holder.

Digital storage medium: is any data repository able to save non-transitory information. This is typically or more hard drives operable by a relational database.

Expiration date: is the date upon which the payment card is no longer valid for executing financial transactions.

Explanation of benefits (EOB): is a statement typically sent by a health insurance entity explaining what medical services were covered under an insurance policy. An EOB will typically include a summary of the services performed, the medical provider's fee and the amount a patient is responsible for.

Fax: is short for facsimile. It is a method of sending image data across the standard phone line to another fax machine. It is considered by many service providers a relatively secure means of transmitting and receiving sensitive financial and medical information.

First payment: is the initial transaction made by the card processor to the service provider using a virtual card payment which. The processing of that transactions enables the card processor to capture information necessary to make subsequent payments directly to the acquirer of the service provider thereby avoiding the need to generate virtual card payments and have those payments manually processed by the service provider.

FTP: (file transfer protocol) is an Internet protocol is used to copy files between computers—usually a client and an archive site. For the purposes of this application this includes encrypted variants such as Explicit FTPS, SSH File Transfer Protocol and tunneling a normal FTP session over an SSH connection.

HTTP: (hypertext transfer protocol) is the protocol used to transmit and receive all data over the World Wide Web. HTTPS is a secure variant of HTTP.

Interchange fee: the fee paid between banks for the acceptance of credit and/or debit card based transactions. The interchange rate may be greater for certain transactions including, but not limited, those wherein the physical card is not present at the point-of-sale card terminal.

Issuing bank: the bank that issues a credit, debit or stored value card to a consumer. This may be synonymous with the card processor in the context of the current claims.

Merchant account: a bank account that permits businesses to accept payments by payment cards such as debit or credit cards.

Merchant Category Code (MCC): is a universal four-digit merchant classification code that identifies the merchant by type of processing, authorization and settlement.

Merchant identification number (MID): is the identification assigned to a merchant by the acquirer.

MMS: (multimedia messaging service) is a store and forward messaging service that allows subscribers to exchange multimedia files as messages. MMS supports the transmission of various media types: text, picture, audio, video, or a combination of all four.

Payment card: refers to any credit card, debit card, stored value card or the like.

Payment receipt: refers to a transmission made by fax, email, or the like confirming that a direct payment has been made from the card processor to the acquirer for the service provider's merchant account. The payment receipt may be a merger of an authorization code, amount paid, date of payment, payer identity and an explanation of benefits into a single file or document.

PCI DSS: is an acronym for the payment card industry data security standard. PCI DSS is a security standard for organizations that handle cardholder information.

Second payment: is made by the card processor directly to the acquirer of the service provider's merchant account. This avoids the need to have the service provider manually process a virtual card payment.

Service provider: refers to the entity that provides services to be paid for. Service providers applicable to the current invention may include, but are not limited to, construction contractors, vehicle repair shops, pharmacies and medical service providers.

SMS: (short message service) is a wireless technology for sending short text messages between mobile phones, fax machines, and IP addresses. It's similar to paging, except that the recipient's phone doesn't need to be active; instead, the message is stored.

SMTP: Simple Mail Transfer Protocol is used to send email. The SMTP protocol provides a common language for different servers to send and receive email messages. The default TCP/IP port for the SMTP protocol is port 25.

Standard Industrial Classification (SIC) code: is a United States government system for classifying industries by a four-digit code.

Stored value card: are those payment cards (in tangible or virtual form) which have a monetary value stored on them. Whereas the prepaid credit card can only be used with authorization from the cardholder, the stored value cards have an anonymous aspect. Examples of stored-value cards include the well-known telephone cards, merchant gift cards, or prepaid debit cards.

Third party administrator: is an organization that adjudicates warranty or insurance claims against a policy and determines what charges should be the insurance carrier's responsibility.

What is claimed is:

1. A method for paying service providers, comprising:
   transmitting a first payment by one or more computers to a service provider from a card processor, the first payment including a first explanation of benefits adjudicated by a third party administrator, a payment card account number, a payment card verification code, an expiration date and a first payment amount;
   receiving by the one or more computers an array of data fields from a card network to the card processor responsive to the service provider processing the first payment, the array of data fields including a merchant identification number associated with the service provider and an acquirer identification associated with the acquirer that processes card transactions on behalf of the service provider;
   storing by the one or more computers the merchant identification number and acquirer identification in a non-transitory digital storage medium accessible by the card processor;
   retrieving via the one or more computers the stored merchant identification number and acquirer identification from the digital storage medium responsive to authorization by the third party administrator to the card processor to issue a second payment to the service provider;
   transmitting via the one or more computers from the card processor, a second payment directly to the acquirer, the second payment transmission including the merchant identification retrieved from the digital storage medium by the card processor and a second payment amount authorized by the third party administrator;
   receiving an authorization response indicating the transaction has been approved and the acquirer will deposit funds associated with the second payment amount on behalf of the service provider; and
   transmitting via the one or more computers a payment receipt to the service provider, the receipt including the amount paid directly to the acquirer and a second explanation of benefits.

2. The method of claim 1, further comprising the steps of:
   establishing one or more anticipated classification codes for a card terminal operated by the service provider; and
   authenticating via the one or more computers the first payment by comparing the one or more anticipated classification codes for the card terminal of the service provider again a classification code received from the card network that authorized the first payment.

3. The method of claim 2 wherein the classification code is a merchant category code.

4. The method of claim 2 wherein the classification code is a standard industrial classification code.

5. The method of claim 1 wherein the payment card account number is associated with a stored value card account.

6. The method of claim 5 wherein the stored value card account is a temporary, single-use account.

7. The method of claim 5 wherein the stored value card account is preloaded with an amount equal to the payment amount.

8. The method of claim 1 further comprising the step of merging the payment receipt and the second explanation of benefits into a single document transmitted to the service provider.

9. The method of claim 8 wherein the document is transmitted by a protocol selected from the group consisting of fax, SMTP, SMS, MMS, HTTP, HTTPS, and FTP.

10. The method of claim 1 wherein the difference between a first interchange fee associated with the first payment and a second interchange fee associated with the second payment is credited to the card processor for reducing risk in the second payment transaction.

11. A system for paying service providers, comprising:
    one or more computers configured to transmit a first payment to a service provider from a card processor, the first payment including a first explanation of benefits adjudicated by a third party administrator, a payment card account number, a payment card verification code, an expiration date and a first payment amount;
    the one or more computers configured to receive an array of data fields from a card network to the card processor responsive to the service provider processing the first payment, the array of data fields including a merchant identification number associated with the service provider and an acquirer identification associated with the acquirer that processes card transactions on behalf of the service provider;
    the one or more computers configured to store the merchant and acquirer identification fields in a non-transitory digital storage medium accessible by the card processor;
    the one or more computers configured to retrieve the stored merchant and acquirer identification fields from the digital storage medium responsive to authorization by the third party administrator to the card processor to issue a second payment to the service provider;
    the one or more computers configured to transmit from the card processor, a second payment directly to the acquirer, the second payment transmission including the merchant identification retrieved from the digital storage medium by the card processor and a second payment amount authorized by the third party administrator;
    the one or more computers configured to receive an authorization response indicating the transaction has been approved and the acquirer will deposit funds associated with the second payment amount on behalf of the service provider; and
    the one or more computers configured to transmit a payment receipt to the service provider, the receipt including the amount paid directly to the acquirer and a second explanation of benefits.

12. The system of claim 11, further including:
    the one or more computers configured to establish one or more anticipated classification codes for a card terminal operated by the service provider; and
    the one or more computers configured to authenticate the first payment by comparing the one or more anticipated classification codes for the card terminal of the service provider again a classification code received from the card network that authorized the first payment.

13. The system of claim 12 wherein the classification code is a merchant category code.

14. The system of claim 12 wherein the classification code is a standard industrial classification code.

15. The system of claim 11 wherein the payment card account number is associated with a stored value card account.

16. The system of claim 15 wherein the stored value card account is a temporary, single-use account.

17. The system of claim 15 wherein the stored value card account is preloaded with an amount equal to the payment amount.

18. The system of claim 11 further including the one or more computers configured to merge the payment receipt and the second explanation of benefits into a single document transmitted to the service provider.

19. The system of claim 18 wherein the document transmission protocol is selectable from the group consisting of fax, SMTP, SMS, MMS, HTTP, HTTPS, and FTP.

20. A method for paying medical service providers, comprising:

- transmitting via one or more computers a first payment to a medical service provider from a card processor, the first payment including a first explanation of benefits adjudicated by a third party administrator, a payment card account number, a payment card verification code, an expiration date and a first payment amount;
- receiving via the one or more computers an array of data fields from a card network to the card processor responsive to the medical service provider processing the first payment, the array of data fields including a merchant identification number associated with the medical service provider and an acquirer identification associated with the acquirer that processes card transactions on behalf of the medical service provider;
- storing via the one or more computers the merchant and acquirer identification fields in a digital storage medium accessible by the card processor;
- retrieving via the one or more computers the stored merchant and acquirer identification fields from the digital storage medium responsive to authorization by the third party administrator to the card processor to issue a second payment to the medical service provider;
- transmitting via the one or more computers from the card processor, a second payment directly to the acquirer, the second payment transmission including the merchant identification retrieved from the digital storage medium by the card processor and a second payment amount authorized by the third party administrator;
- receiving via the one or more computers an authorization response indicating the transaction has been approved and the acquirer will deposit funds associated with the second payment amount on behalf of the medical service provider; and
- transmitting via the one or more computers a payment receipt to the medical service provider, the receipt including the amount paid directly to the acquirer and a second explanation of benefits.

* * * * *